United States Patent [19]

Mangold

[11] Patent Number: 4,469,292
[45] Date of Patent: Sep. 4, 1984

[54] TAPE CASSETTE

[75] Inventor: Hans Mangold, Fuerth, Fed. Rep. of Germany

[73] Assignee: Grundig E. M. V., Fuerth, Fed. Rep. of Germany

[21] Appl. No.: 375,208

[22] Filed: May 5, 1982

[30] Foreign Application Priority Data

Oct. 27, 1981 [DE] Fed. Rep. of Germany ....... 3142519

[51] Int. Cl.³ ............................................. G11B 23/04
[52] U.S. Cl. ..................................... 242/199; 360/132
[58] Field of Search ............... 242/199, 197, 198, 200, 242/71.1, 71.2; 206/387, 389; 360/93, 96.1, 132

[56] References Cited

U.S. PATENT DOCUMENTS

| 3,701,495 | 10/1972 | Holliday | 242/197 |
| 3,955,779 | 5/1976 | Bielik | 242/199 |
| 4,030,602 | 6/1977 | Muller et al. | 206/387 X |
| 4,130,848 | 12/1978 | Amano et al. | 360/132 |
| 4,306,690 | 12/1981 | Izaki et al. | 206/387 X |

Primary Examiner—Stuart S. Levy
Assistant Examiner—Scott J. Haugland
Attorney, Agent, or Firm—Kane, Dalsimer, Kane, Sullivan & Kurucz

[57] ABSTRACT

A tape cassette of a relatively small size for use in portable tape devices and the like. The cassette is formed out of two displaceable sections containing respective winding spools for the tape wherein in the sections move from a first position in which the cassette is relatively small to a second or expanded position wherein the cassette can be used in a larger tape device. A receiving container is provided adapted to receive the tape cassette to provide an outer dimension of a larger size, such as that utilizable in a standard video player/recorder.

10 Claims, 3 Drawing Figures

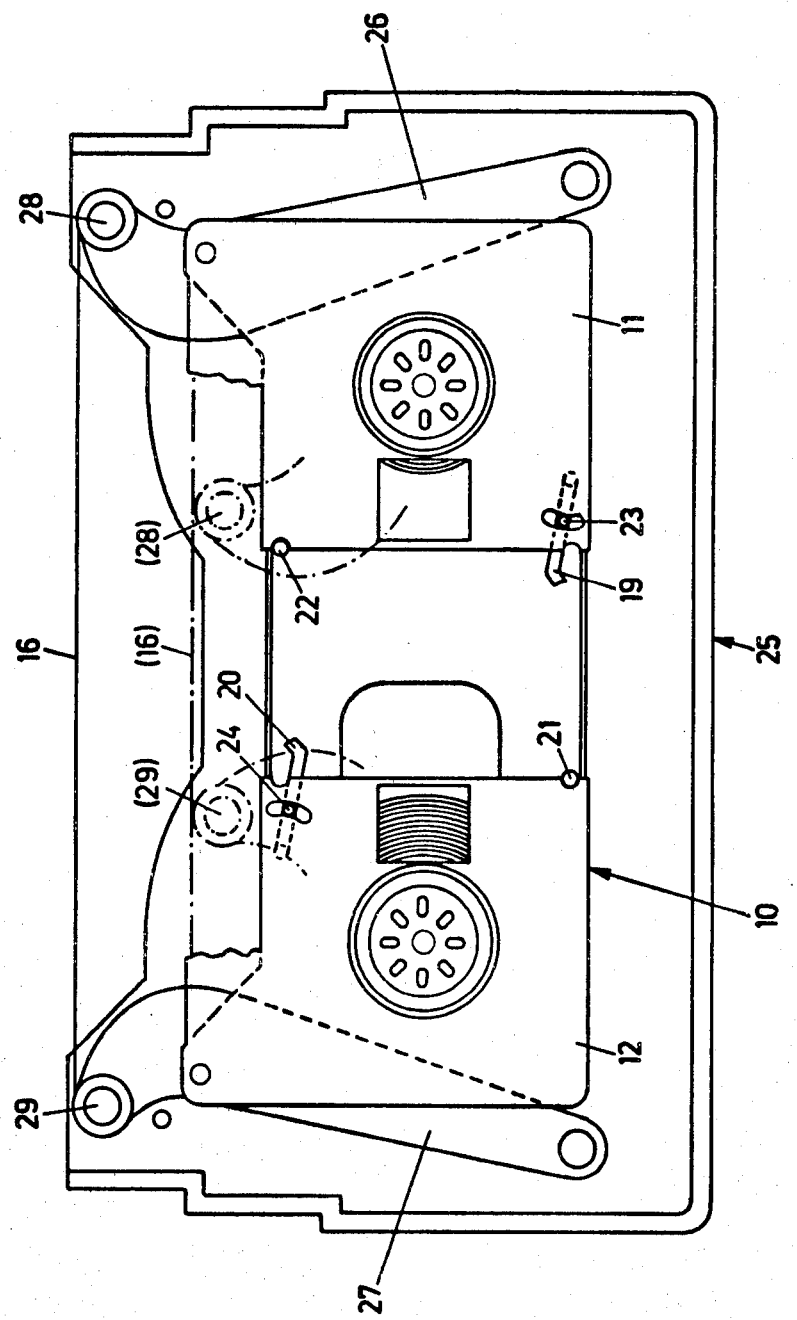

TAPE CASSETTE

FIELD OF THE INVENTION

The present invention relates to a tape cassette cartridge more particularly a cassette that is adaptable for both a standard and portable recording and playing device.

BACKGROUND OF THE INVENTION

The use of magnetic tape cassettes and the like have ever increasing recent applications, the more recent of which is in video recording and playback. Usually the size of a magnetic tape recording and playback device substantially depends upon the size of the cassette used. With the increasing minitaturization of electronic parts (IC's etc.) and accordingly the recording and playback devices, ever smaller cassettes can be utilized. This can be seen in the small audio recorders presently on the market.

So to, in the video area, where handheld portable video recorders are available which, with the assistance of a video camera, allows for video recording. In such situations, a prolonged recording is often not involved so that a small cassette may be utilized. Accordingly, such portable devices are reduced in size and geared towards utilizing the relatively small cassettes.

As compared, in a large playback magnetic device, such as a home video device, a long play duration of the cassette is more often the case, as in movie cassettes, etc. Accordingly, in such a situation a minimum or larger standard size cassette is utilized.

Due to the different purposes of the magnetic tape devices, i.e., the portable recorder versus the home display, there has resulted in cassettes of one size being utilized in one and of another size in the other. The desire to have the portable video record somewhat small in nature has resulted in the use of a small standardized cassette. Whereas in the home video playback device, a larger standardized cassette is utilized. This leads to the result that the cassettes are not interchangeable between the devices, or requires that the portable device utilize a relatively large cassette, defeating an objective of the device.

Accordingly, it has become desirable to allow cassettes of the smaller, portable use type to be utilized in devices which normally take a larger standardized cassette. In this regard, there presently exists an adapter which is used to allow the smaller cassettes to be played in devices which use the larger cassettes. However, this adaptor is very complicated requiring gear transmission to equalize the tape winding distances and accordingly are very expensive, limiting their application.

SUMMARY OF THE INVENTION

Accordingly, it is an object of the invention to provide for a tape cassette which can be utilized in both a small or portable as well as a large tape player and recorder, such as a home video device, which is relatively simple in design, construction and implementation.

In this regard, the present invention provides for a magnetic tape cassette having a relatively small, substantially square shape body, containing two winding spools, for the magnetic tape. The body is formed of two displaceable half sections which when abutting each other is of a size standardly used in portable recording devices such as a video recorder and camera etc. A guide means connects the two half sections in the form of a hollow rectangular tube which allows the sections to be slidably displaced from each other so as to increase the overall length of the cassette. This readily allows its use in a magnetic tape device which utilizes larger size cassettes wherein the winding drives are at an increased distance from each other. In the case of the home video devices and the like, a receiving container may be utilized with the cassette placed therein to conform to the outer dimensions required. Thus the present invention provides for complete interchangeability of the smaller size cassettes in tape devices made for the larger size cassettes.

BRIEF DESCRIPTION OF THE DRAWINGS

The aforenoted object and advantages and others are realized by the present invention, the description of which should be taken in conjunction with the drawings wherein:

FIG. 3 is a top plan partially phantom view of the tape cassette in a tape container.

DETAILED DESCRIPTION OF THE PREFERRED EMBODIMENT

Figure 1:
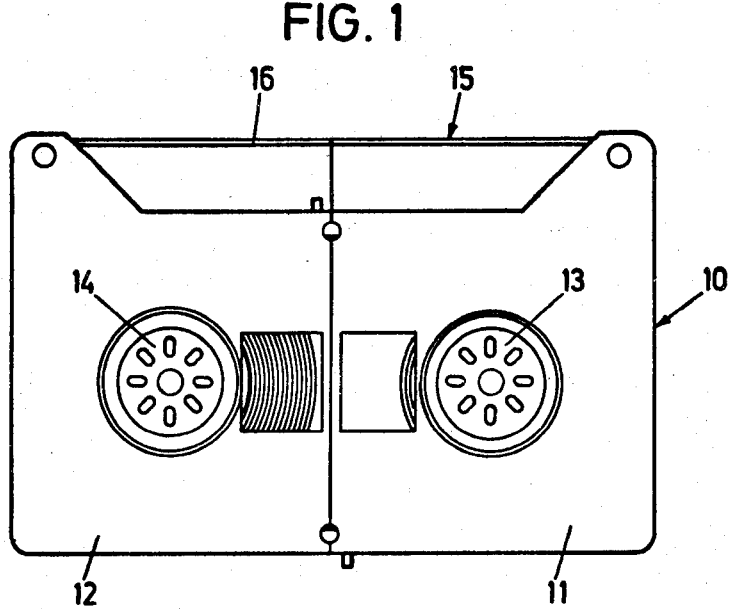
FIG. 1 is a top plan view of the tape cassette incorporating the teachings of the present invention.

With reference to the Figures, a tape cassette 10 is provided for magnetic tape and the like, and is illustrated in FIG. 1 as having a substantially square standard shape such as that which may be utilized in a portable device, etc. The tape cassette 10 consists of two half-sections 11 and 12 which are basically mirror symmetric with respect to each other. Respective winding spools 13 or 14 are disposed within half section 11 and 12. An opening or recess 15 is provided at one side of the tape cassette 10 for the recording/playback or the eraser head of the recording or playing device. The opening 15 may partially extend to the large faced broad side of the tape cassette 10 as shown. The magnetic tape 16 in the cassette 10 is guided by way of standard or typical guides in recess 15 along a longitudinal edge of the tape cassette 10, for engagement with the recording/playback or the eraser head when inserted into the device. The operation of the cassette 10 would be typical of cassettes presently used and as aforenoted could be a portable device generally utilizing a smaller cassette than that utilized in a home video system.

Figure 2:
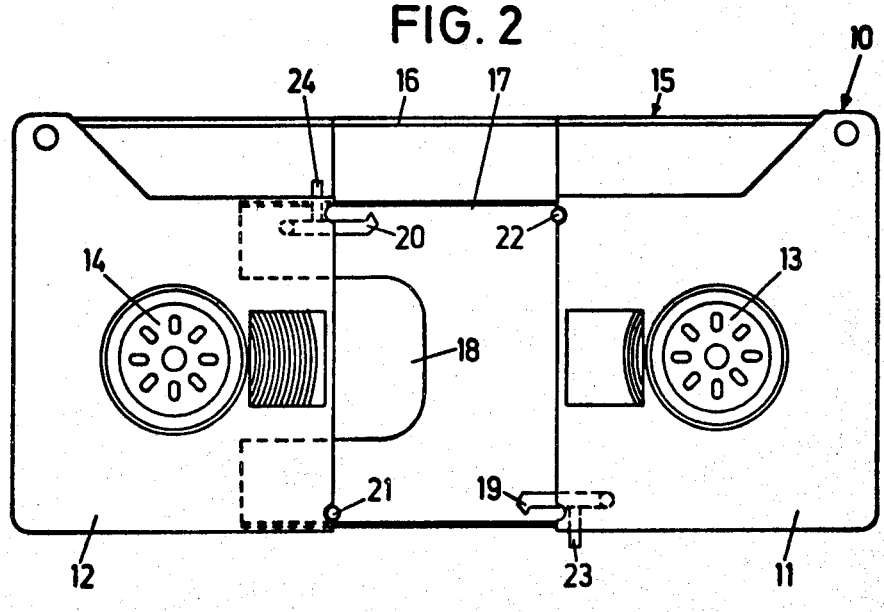
FIG. 2 is a top plan partially phantom view of the tape cassette in an expanded position.

Turning now to FIG. 2 this illustrates the tape cassette 10 in a pulled out or expanded state. The tape winders 13 and 14 are displaced to a distance from each other corresponding to a larger standard cassette winding drive means utilized in the larger tape devices. This is achieved by a substantially hollow tubular guide section 17 having a rectangular cross section which, as shown, is connected to the inner wall of the half section 11 while is guided along the inner wall of the other half section 12. The length of the guide section 17 is preferably such that the tape cassette 10 in its pulled out state still has a sufficient overlap between the guiding section 17 and the inner wall of half section 12 for stability and support. Note that in the collapsed or retracted state, guide section 17 adds to the overall strength of the tape cassette 10.

A recess 18 in the hollow tubular guide section 17 and prevents the interfering of the guide section 17 with the operation of winding spool 14.

In the retracted state of the magnet cassette 10 as shown in FIG. 2, two oppositely disposed hook-like levers 19 and 20 engage respective protrusions 21 and 22 maintained by the cassette, thus locking the cassette in the retracted condition which is readily apparent from a review of the figures. These levers 19 and 20 are pivoted out of their locked position by pin like plungers 23 or 24. Of course, the illustrated levers 19 and 20 could also engage respective recesses of the opposite half section 11 or 12, if so desired. Note, an alternative to the plungers 23 and 24 position with respect to the levers 19 and 20 as shown in FIG. 2, that the plungers 23 and 24 may also be positioned vertically with respect to the pivot plane of levers 19 and 20 as shown in FIG. 3. In the former case, the levers 19 and 20 are pivoted by a push movement of the plungers 23 and 24 at a right angle to the direction of the levers 19 and 20's movement. In the latter situation, the levers 19 and 20 pivot via force on the plungers 23 or 24 via eye openings, in a parallel direction to that of the levers movement. Note that other means of coupling the two half sections 11 and 12 can be also implemented and will be readily apparent to those skilled in the art. Accordingly, the present means while preferred is by no means exclusive.

If the outer dimension tape cassette 10 in its pulled out state is still too small, with perhaps that of the standardized cassette to be used such as that of the video home device, a receiving container 25 may be utilized whose outer dimensions conform with the standardized dimensions of the larger normal cassette for insertion into the device. In this regard, two pivot arms 26 and 27 with respective tape feeding elements 28 and 29 are disposed within the receiving container 25.

In the rest position of the pivot levers 26 and 27, the tape feeding elements (28) and (29) depicted bracketed, are placed or positioned behind the tape (16) of the tape cassette 10. In operation, levers 26 and 27 pivot, i.e., by way of spring loading etc., to deflect in tape 16 to that as shown in FIG. 3. This causes the tape 16 to the same position as the tape in the larger standardized tape cassette. The completed unit formed by the receiving container 25 and the tape cassette 10 is therefore readily exchangeable with the standardized larger cassettes. In this form, it can be inserted into a large tape recording or playing device, such as a video home system without causing any problems. Note also that the receiving container 25 may also be provided with a removable lid or cover, if so desired.

Accordingly, it is readily apparent from the foregoing that the present invention enables the full use of the advantages of a small cassette in portable devices and simultaneously the use of such a cassette in a larger device such as a video home system. Also, by positioning the tape cassette 10 in the receiving container 25, it is possible to play a quarter inch tape cassette in a large playing/recording which takes half inch tape cassette, provided that the device is so designed that operates in the return or reverse operation and record or scans only half of the width of the tape at each run through. Thus, for example the compatibility between a portable recording device utilizing a quarter inch tape and a playback device with half inch tape is also realized.

In view of the foregoing, the present invention realizes its aforenoted object and advantages and others, and although a preferred embodiment has been disclosed and described in detail herein its scope should not be limited thereby, rather its scope should be determined by that of the pending claims.

What is claimed is:

1. A tape cassette for recording/playback devices and the like, said cassette being adjustable to accommodate for differences in distance between take up and supply reel spindles in such devices, said cassette comprising: essentially rectangular sections each with two opposed walls in which respective winding spools are mounted; recording and/or playing tape maintained on said spools and adapted to pass therebetween in a predetermined path essentially parallel to one side of the cassette; an opening in said cassette adjacent said path to allow access to the tape by recording, playback or erase heads of a recorder/playback device; guide means having a rectangular cross-section displaceably connecting said sections together by engaging inner surfaces of said two opposed walls of each said section wherein the sections are displaceable along the guide means to vary the distance between the spools while maintaining them aligned so as to allow the use of the cassette in recorder/playback devices having different distances between take up and supply reel spindles while maintaining said tape in said predetermined path whether the sections are displaced from each other or in a non-displaced position.

2. The tape cassette in accordance with claim 1 wherein said guide means is in the form of a hollow member having a rectangular cross section which is fixedly coupled to a section at one of its ends, and slidably engages to the other section at the other end.

3. The tape cassette in accordance with claims 2 or 1 wherein said guide means remains partially disposed in the slidably engaged section when the sections are fully separated; and said guide means is provided with a recess means to prevent interference between said guide means and the winding spools of the slidably engaged section.

4. A tape cassette for recorder/playback devices and the like, said cassette being adjustable to accommodate for differences in distance between take up and supply reel spindles in such devices, said cassette comprising:
an essentially rectangular shaped body formed by at least two rectangular sections each with two opposing walls in which respective winding spools are mounted; recording and/or playing tape maintained on said spools and adapted to pass therebetween in a predetermined path; an opening in said body adjacent said path to allow access to the tape by recording, playback or erase heads of a recorder/playback device; guide means comprising an essentially hollow tube having a substantially rectangular cross section extending from a first one of said sections and slidably engaging the inner wall surfaces of the other of said sections; whereby said other section is displaceable along the guide means to vary the distance between the spools, said spools being maintained in alignment so as to allow the use of the cassette in recorded/playback having different distances between take up and supply reel spindles.

5. The tape cassette in accordance with claim 4 or 1 which includes locking means capable of locking the two sections in a fixed position.

6. The tape cassette in accordance with claim 5 wherein said locking means includes a hook-like lever on one section adapted to engage or disengage with a recess or protrusion on the other section in a locking or unlocking fashion.

7. The tape cassette in accordance with claim 6 wherein said lever is movable from a fixed point for locking or unlocking with said movement facilitated by an actuating means.

8. In combination with the tape cassette in accordance with claim 4 or 1 a receiving container comprising an outer casing having inner dimensions sufficient to receive the tape cassette when the two sections are at a predetermined point displaced from each other; take up means in the form of at least two pivot arms and corresponding tape feed means adapted to engage the tape in the tape cassette and guide it within the receiving container so as to allow the feeding of the tape in said container.

9. The combination in accordance with claim 8 wherein the outer dimensions of the container corresponds to that utilizable in a first standardized size; the outer dimensions of the tape cassette when said sections are not displaced corresponds to a second standardized size and said first size is larger than the second size.

10. The combination in accordance with claim 9 wherein size of a container of the first standardized size corresponds to a tape cassette which uses a tape of approximately one half inch in width, and the size of the cassette of the second standardized size corresponds to a tape cassette which uses a tape of approximatley one quarter inch in width.

* * * * *

UNITED STATES PATENT AND TRADEMARK OFFICE
CERTIFICATE OF CORRECTION

PATENT NO. : 4,469,292

DATED : September 4, 1984

INVENTOR(S) : Hans Mangold

It is certified that error appears in the above-identified patent and that said Letters Patent is hereby corrected as shown below:

Column 4, Line 31, "coupled" should be --engages--;

Line 60, "recorded" should be --recorder--.

Signed and Sealed this

Ninth Day of April 1985

[SEAL]

Attest:

DONALD J. QUIGG

Attesting Officer    Acting Commissioner of Patents and Trademarks